(12) United States Patent
Nelson et al.

(10) Patent No.: US 12,320,897 B2
(45) Date of Patent: Jun. 3, 2025

(54) HIGH RESOLUTION TIME-OF-FLIGHT MEASUREMENTS

(71) Applicant: ams AG, Premstaetten (AT)

(72) Inventors: Doug Nelson, Eindhoven (NL); Pradeep Hegde, Eindhoven (NL); Timothy Cogan, Eindhoven (NL)

(73) Assignee: AMS AG, Premstaetten (AT)

( * ) Notice: Subject to any disclaimer, the term of this patent is extended or adjusted under 35 U.S.C. 154(b) by 1066 days.

(21) Appl. No.: 17/282,575

(22) PCT Filed: Oct. 4, 2019

(86) PCT No.: PCT/EP2019/076895
§ 371 (c)(1),
(2) Date: Apr. 2, 2021

(87) PCT Pub. No.: WO2020/070280
PCT Pub. Date: Apr. 9, 2020

(65) Prior Publication Data
US 2021/0341609 A1    Nov. 4, 2021

Related U.S. Application Data

(60) Provisional application No. 62/741,337, filed on Oct. 4, 2018.

(51) Int. Cl.
*G01S 17/10* (2020.01)
*G01S 7/481* (2006.01)
*G01S 7/4865* (2020.01)

(52) U.S. Cl.
CPC ............ *G01S 17/10* (2013.01); *G01S 7/4814* (2013.01); *G01S 7/4816* (2013.01); *G01S 7/4865* (2013.01)

(58) Field of Classification Search
CPC ...... G01S 17/10; G01S 7/4814; G01S 7/4816; G01S 7/4865; G01S 17/931;
(Continued)

(56) References Cited

U.S. PATENT DOCUMENTS

2004/0233416 A1   11/2004   Doemens et al.
2016/0223656 A1    8/2016   Hall et al.
(Continued)

FOREIGN PATENT DOCUMENTS

CN    103261912 A    8/2013
CN    107209254 A    9/2017
(Continued)

OTHER PUBLICATIONS

Hartzell Preston J et al: "Empirical Waveform Decomposition and Radiometric Calibration of a Terrestrial Full-Waveform Laser Scanner", IEEE Transactions On Geoscience and Remote Sensing, IEEE Service Center, Piscataway, NJ, US, vol. 53, No. 1, Jan. 1, 2015 (Jan. 1, 2015), pp. 162-172, XP011555430, ISSN: 0196-2892, DOI: 10.1109/TGRS.2014.2320134 [retrieved on Aug. 4, 2014] p. 612, right-hand col. line 1-line 11 p. 164, left-hand col. line 31—right-hand col. line 25 table I figures 1-3.
(Continued)

*Primary Examiner* — Isam A Alsomiri
*Assistant Examiner* — Joseph C Fritchman
(74) *Attorney, Agent, or Firm* — Tarolli, Sundheim, Covell & Tummino LLP

(57) ABSTRACT

Modulated light is generated using a light source of a sensor module. Using a photodetector of the sensor module, an intensity of modulated light reflected from an object towards the photo detector is measured over a period of time. An electronic control device bins the measured intensity of the reflected modulated light according to a plurality of temporal bins, determines a first temporal bin having the greatest
(Continued)

intensity among the plurality of temporal bins, and estimates a distance between the sensor module and the object based on a first temporal bin, and one or more additional temporal bins of the plurality of temporal bins.

12 Claims, 14 Drawing Sheets

(58) Field of Classification Search
CPC ........ G01S 7/4915; G01S 7/497; G01S 17/18; G01S 17/36; G01S 7/4802
See application file for complete search history.

(56) References Cited

U.S. PATENT DOCUMENTS

| | | |
|---|---|---|
| 2016/0245920 A1 | 8/2016 | Boufounos et al. |
| 2016/0259038 A1 | 9/2016 | Retterath et al. |
| 2017/0082746 A1 | 3/2017 | Kubota et al. |
| 2018/0164415 A1 | 6/2018 | Buckley et al. |
| 2018/0253404 A1 | 9/2018 | Moore et al. |
| 2021/0116572 A1* | 4/2021 | Kimura ................. G01S 17/894 |

FOREIGN PATENT DOCUMENTS

| | | | |
|---|---|---|---|
| DE | 10138531 A1 * | 3/2003 | ............. G01S 17/89 |
| EP | 3250944 B1 | 3/2019 | |

OTHER PUBLICATIONS

Chinese Office Action for CN application No. 201980065242.X, dated Jun. 12, 2024, 19 pages.

Applicant: ams AG; "High Resolution Time of Flight Measurments" CN Application No. 201980065242; CN Office Action dated Jun. 3, 2023; 20 pgs.

* cited by examiner

HIGH RESOLUTION TIME-OF-FLIGHT MEASUREMENTS

RELATED APPLICATIONS

The present invention is a U.S. National Stage under 35 USC 371 patent application, claiming priority to Serial No. PCT/EP2019/076895, filed on 4 Oct. 2019; which claims priority of U.S. Provisional Application Ser. No. 62/741,337, filed on 4 Oct. 2018, the entirety of both of which are incorporated herein by reference.

TECHNICAL FIELD

The disclosure relates to time-of-flight sensors.

BACKGROUND

A time-of-flight sensor is a range imaging system that resolves distances based on the known speed of light. As an example, a "direct" time-of-flight sensor can emit a pulse of light toward an object, and detect light that reflects from the object and returns to the sensor. The distance between the object and the sensor can be determined based on the length of time between the emission of light and the return of light to the sensor (e.g., the "time of flight" of the light from the sensor to the object, and back to the sensor).

As another example, an "indirect" time-of-flight sensor can emit modulated light toward the object, and detect modulated light that reflects from the object and returns to the sensor. The distance between the object and the sensor can be determined based on a phase difference between the emitted modulated light and the returning modulated light.

Time-of-flight sensors can be used in a variety of different applications to detect the presence and position of objects with respect to the sensor. As examples, time-of-flight sensors can be used for in vehicular sensing systems, robotics systems, and/or mobile computing devices (e.g., smartphones, tablet computers, wearable devices, etc.).

SUMMARY

A time-of-flight sensor can resolve distances between the sensor and an object. The distance resolution of a time-of-flight sensor depends, at least in part, on the sensor's ability to determine the elapsed time between the emission of light of and the return of reflected light precisely (e.g., using one or more timekeeping components, such as a time to digital converter [TDC]). In practice, timekeeping components having higher temporal resolutions are often more expensive and/or complex to produce. Accordingly, during the design process of a time-of-flight sensor, the distance resolution of the time-of-flight sensor is often balanced against practical considerations (e.g., the expense and/or complexity of components used in the sensor).

The distance resolution of a time-of-flight sensor can be enhanced using a variety of data processing techniques. These techniques can be performed either as an alternative to or in addition to using timekeeping components having higher temporal resolutions.

As an example, a time-of-flight sensor can emit light towards an object, measure the intensity of light reflecting from the object, and bin the measurements according to a number of temporal bins. The sensor can interpolate the distance between the sensor and the object based on the binned measurements. As an example, the sensor can identify a first temporal bin having the greatest intensity among the temporal bins, and one or more additional temporal bins adjacent to or in proximity to the first temporal bin. The sensor can estimate the distance based on the intensity values of each of these temporal bins.

As another example, a time-of-flight sensor can emit light towards an object positioned at a known distance from the sensor, measure the intensity of light reflecting from the object, and bin the measurements according to a number of temporal bins. This measurement process can be repeated several times with respect to multiple different object distances. An interpolated signal waveform representing the object can be determined based on the binned measurements. In some cases, the interpolated signal waveform is used to determine the physical structure of the object according to a higher resolution than might otherwise be possible. In some cases, the interpolated signal waveform is used to determine the distance between the sensor and the object more precisely in future measurements.

The implementations described herein can provide a variety of benefits. In some implementations, a time-of-flight sensor can obtain measurements that are more accurate and/or precise (e.g., compared to measurements conducted without the performance of the disclosed techniques). Further, measurements from the time-of-flight sensor be used by other devices (e.g., vehicles, robots, mobile devices, etc.) to ascertain their surroundings more accurately, and more effectively adapt their operations based on this information.

In an aspect, a method includes generating modulated light using a light source of a sensor module, and measuring, using a photodetector of the sensor module, an intensity of modulated light reflected from an object towards the photodetector over a period of time. The method also includes binning, using an electronic control device, the measured intensity of the reflected modulated light according to a plurality of temporal bins, determining, using the electronic control device, a first temporal bin having the greatest intensity among the plurality of temporal bins, and estimating, using the electronic control device, a distance between the sensor module and the object based on a first temporal bin, and one or more additional temporal bins of the plurality of temporal bins.

Implementations of this aspect can include one or more of the following features.

In some implementations, each temporal bin corresponds to a respective different distance between the sensor module and the object. Estimating the distance between the sensor module and the object can include determining a distance offset with respect to the distance corresponding to the first temporal bin. The distance offset can be less than a difference between the distance corresponding to the first temporal bin, and the distance corresponding to a second temporal bin temporally adjacent to the first temporal bin.

In some implementations, estimating the distance between the sensor module and the object includes determining an intensity of a second temporal bin temporally adjacent to the first temporal bin. Estimating the distance between the sensor module and the object can include determining an intensity of a third temporal bin temporally adjacent to the first temporal bin. The second temporal bin can be different from the third temporal bin. The first temporal bin can correspond to a first time interval of the period of time. The second temporal bin can correspond to a second time interval of the period of time prior to the first time interval. The third temporal bin can correspond to a third time interval of the period of time subsequent to the first time interval. Estimating the distance between the sensor module and the object can include determining a measurement parameter based on an intensity of the first temporal bin, the intensity of the second temporal bin, and the intensity of the third temporal bin, obtaining one or more data items indicating a relationship between a plurality of sample values of the measurement parameter and a plurality of corresponding sample distance offsets, and determining the distance between the sensor module and the object based on the measurement parameter and the relationship. The measurement parameter can be equal to (c−a)/(b−min (c, a), where a is the intensity of the second temporal bin, b is the intensity of the first temporal bin, and c is the intensity of the third temporal bin. The relationship between the plurality of sample values of the measurement parameter and the plurality of corresponding sample distance offsets can be a monotonic relationship.

In some implementations, the sensor module includes a time of flight sensor module. In some implementations, the light source includes a laser emitter. In some implementations, the photodetector includes a photodiode.

In another aspect, a system includes a sensor module having a light source and a photodetector, and an electronic control device. The sensor module is operable to generate modulated light using the light source, and measure, using the photodetector, an intensity of modulated light reflected from an object towards the photodetector over a period of time. The electronic control device is operable to bin the measured intensity of the reflected modulated light according to a plurality of temporal bins, determine a first temporal bin having the greatest intensity among the plurality of temporal bins, and estimate a distance between the sensor module and the object based on a first temporal bin, and one or more additional temporal bins of the plurality of temporal bins.

Implementations of this aspect can include one or more of the following features.

In some implementations, each temporal bin corresponds to a respective different distance between the sensor module and the object. The electronic control device's estimating the distance between the sensor module and the object can include determining a distance offset with respect to the distance corresponding to the first temporal bin. The distance offset can be less than a difference between the distance corresponding to the first temporal bin, and the distance corresponding to a second temporal bin temporally adjacent to the first temporal bin.

In some implementations, the electronic control device's estimating the distance between the sensor module and the object includes determining an intensity of a second temporal bin temporally adjacent to the first temporal bin. The electronic control device's estimating the distance between the sensor module and the object can include determining an intensity of a third temporal bin temporally adjacent to the first temporal bin, wherein the second temporal bin is different from the third temporal bin. The first temporal bin can correspond to a first time interval of the period of time. The second temporal bin can correspond to a second time interval of the period of time prior to the first time interval. The third temporal bin can correspond to a third time interval of the period of time subsequent to the first time interval. The electronic control device's estimating the distance between the sensor module and the object can include determining a measurement parameter based on an intensity of the first temporal bin, the intensity of the second temporal bin, and the intensity of the third temporal bin, obtaining one or more data items indicating a relationship between a plurality of sample values of the measurement parameter and a plurality of corresponding sample distance offsets, and determining the distance between the sensor module and the object based on the measurement parameter and the relationship. The measurement parameter can be equal to (c−a)/(b−min (c, a), wherein a is the intensity of the second temporal bin, b is the intensity of the first temporal bin, and c is the intensity of the third temporal bin. The relationship between the plurality of sample values of the measurement parameter and the plurality of corresponding sample distance offset can be a monotonic relationship.

In some implementations, the sensor module includes a time of flight sensor module. In some implementations, the light source includes a laser emitter. In some implementations, the photodetector includes a photodiode.

In some implementations, a host device includes a system described herein. The host device can be operable to use data obtained by the sensor of the system for one or more functions executed by the host device.

In another aspect, a method includes positioning an object at each of a plurality of distances from a sensor module, and generating, for each distance, a corresponding set of measurements. Generating each set of measurements includes generating modulated light using a light source of the sensor module, measuring, using a photodetector of the sensor module, an intensity of modulated light reflected from an object towards the photodetector over a period of time, and binning, using an electronic control device, the measured intensity of the reflected modulated light according to a plurality of temporal bins. The method also includes determining, based on the sets of measurement, a first signal waveform representing a physical structure of the object.

Implementations of this aspect can include one or more of the following features.

In some implementations, determining the first signal waveform includes determining, for each temporal bin, a second signal waveform representing an intensity of that temporal bin with respect to each of the distances of the plurality of distances.

In some implementations, determining the first signal waveform includes normalizing an intensity of at least one second signal waveform.

In some implementations, determining the first signal waveform includes aligning the second signal waveforms with one another.

In some implementations, determining the first signal waveform includes averaging the second signal waveforms to obtain an averaged second signal waveform.

In some implementations, determining the first signal waveform includes deconvolving the averaged second signal waveform to obtain the first signal waveform. Deconvolving the averaged second signal waveform can include performing a Wiener deconvolution with respect to the averaged second signal waveform.

In some implementations, the physical structure is at least one of a size or a shape of the object.

In some implementations, the sensor module includes a time of flight sensor module. In some implementations, the light source includes a laser emitter. In some implementations, the photodetector includes a photodiode.

In another aspect, a system includes a sensor module having a light source and a photodetector, and an electronic control device. The sensor module is operable, with respect to an object positioned at each of a plurality of distances from the sensor module, to generate, for each distance, a corresponding set of measurements. Generating each set of measurements includes generating modulated light using the light source, and measuring, using the photodetector, an intensity of modulated light reflected from an object towards the photodetector over a period of time. The electronic control device is operable to bin the measured intensity of the reflected modulated light according to a plurality of temporal bins, and determine, based on the sets of measurement, a first signal waveform representing a physical structure of the object.

Implementations of this aspect can include one or more of the following features.

In some implementations, the electronic control device's determining the first signal waveform includes determining, for each temporal bin, a second signal waveform representing an intensity of that temporal bin with respect to each of the distances of the plurality of distances.

In some implementations, the electronic control device's determining the first signal waveform includes normalizing an intensity of at least one second signal waveform.

In some implementations, the electronic control device's determining the first signal waveform includes aligning the second signal waveforms with one another.

In some implementations, the electronic control device's determining the first signal waveform includes averaging the second signal waveforms to obtain an averaged second signal waveform.

In some implementations, the electronic control device's determining the first signal waveform includes deconvolving the averaged second signal waveform to obtain the first signal waveform. The electronic control device's deconvolving the averaged second signal waveform can include performing a Wiener deconvolution with respect to the averaged second signal waveform.

In some implementations, the physical structure is at least one of a size or a shape of the object.

In some implementations, the sensor module includes a time of flight sensor module. In some implementations, the light source includes a laser emitter. In some implementations, the photodetector includes a photodiode.

In some implementations, a host device includes a system described herein. The host device can be operable to use data obtained by the sensor of the system for one or more functions executed by the host device.

The details of one or more implementations are set forth in the accompanying drawings and the description below. Other aspects, features and advantages will be apparent from the description and drawings, and from the claims.

DETAILED DESCRIPTION

A time-of-flight sensor can resolve distances between the sensor and an object. The distance resolution of a time-of-flight sensor depends, at least in part, on the sensor's ability to determine the elapsed time between the emission of light of and the return of reflected light precisely. As an example, a time-of-flight sensor can include a timekeeping component (e.g., a time to digital converter [TDC]) that measures the elapsed time according to a particular temporal resolution. If the temporal resolution of the timekeeping component is low (e.g., the timekeeping component measures time with a low degree of precision), the sensor resolves distances according to a low distance resolution (e.g., the sensor determines the distance with a low degree of precision). However, if the temporal resolution of the timekeeping component is comparatively higher (e.g., the timekeeping component measures time with a higher degree of precision), the sensor can resolve distances according to a higher distance resolution (e.g., the sensor determines the distance with a higher degree of precision).

In practice, timekeeping components having higher temporal resolutions are often more expensive and/or complex to produce. Accordingly, during the design process of a time-of-flight sensor, the distance resolution of the time-of-flight sensor is often balanced against practical considerations (e.g., the expense and/or complexity of components used in the sensor).

The distance resolution of a time-of-flight sensor can be enhanced using a variety of data processing techniques. These techniques can be performed either as an alternative to or in addition to using timekeeping components having higher temporal resolutions. As an example, the techniques can be performed using a time-of-flight sensor with timekeeping components having a lower temporal resolution (e.g., to enhance the distance resolution without using more expensive and/or complex timekeeping components). As another example, the techniques can be performed using a time-of-flight sensor with timekeeping components having a higher temporal resolution (e.g., to enhance the distance resolution beyond what might otherwise be possible using the timekeeping components).

For instance, a time-of-flight sensor can emit light towards an object, measure the intensity of light reflecting from the object, and bin the measurements according to a number of temporal bins (e.g., corresponding to periods of time during which the measured light returned to the sensor). The sensor can interpolate the distance between the sensor and the object based on the binned measurements. As an example, the sensor can identify a first temporal bin having the greatest intensity among the temporal bins, and one or more additional temporal bins adjacent to or in proximity to the first temporal bin. The sensor can estimate the distance based on the intensity values of each of these temporal bins.

Figure 1:
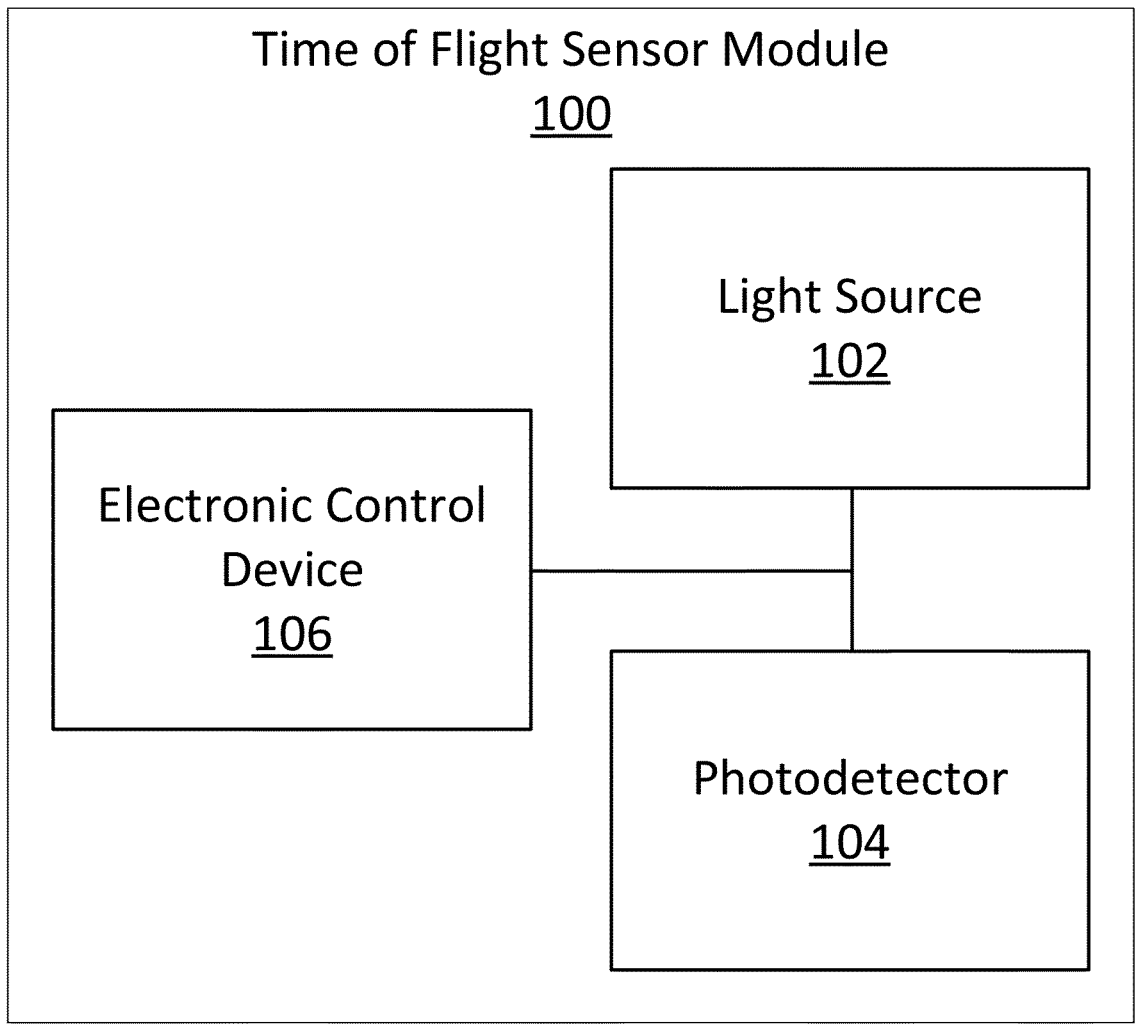
FIG. 1 is a schematic diagram of an example time-of-flight sensor module.

An example time-of-flight sensor module 100 is shown in FIG. 1. The sensor module 100 includes a light source 102, a photodetector 104, and an electronic control device 106. In an example usage of the sensor module 100, the light source 102 generates lights, which is emitted toward a subject (e.g., an object in proximity to the sensor module 100). The photodetector 104 measures light that reflects from the subject and returns to the sensor module 100. The electronic control device 106 determines information regarding the subject (e.g., the distance between the object and the sensor module 100 and/or the physical structure of the object) based on information regarding the emitted light and the returning light.

The light source 102 is a component operable to generate light and emit light toward the subject. In some cases, the light source 102 is operable to emit one or more pulses of light (e.g., one, three, three, or more pulses). These pulses can be emitted continuously, periodically, intermittently, or according to some other pattern. In some cases, the light source 102 is operable to emit modulated light. For instance, the light source 102 can obtain a periodic waveform (e.g., a carrier signal), and vary one or more properties of the waveform with a modulating signal containing information to be transmitted. In some cases, the modulated signal is a pulse-modulated signal or a continuous-wave modulated signal. In some cases, the light source 102 is operable to generate light having particular spectral characteristics (e.g., generate light signals having a particular wavelength or range of wavelengths). The light source 102 can include one or more light emitting elements. As an example, the light source 102 can include one or more light emitting diodes (LEDs), vertical cavity surface emitting lasers (VCSELs), organic light emitting diodes (OLEDs), or other devices that selectively generate light.

The electronic control device 106 can control the operation of the light source 102. For example, the electronic control device 106 can be communicatively coupled to the light source 102, and selectively turn on or off the light source 102 (e.g., to generate light during selected periods of time, such as during a measurement operation). As another example, the electronic control device 106 can specify the characteristics of the generated light (e.g., to generate light according to a specific pattern, spectral composition, etc.). Further, the electronic control device 106 can obtain information describing the characteristics of the emitted light (e.g., the time at which the light is emitted, the intensity of the emitted light, the spectral composition of the emitted light, the phase of the emitted light, etc.).

The photodetector 104 is a component operable to measure light incident upon the photodetector 104 (e.g., light emitted from the light source 102, and reflected from the object back toward the photodetector 104). The photodetector 104 can measure various characteristics of light. In some cases, the photodetector 104 measures the intensity of light and/or the spectral characteristics of the light. In some cases, the photodetector 104 determines the time at which the light was detected. In some cases, the photodetector 104 determines the transient properties of the light, such as a phase of the light. In some cases, the photodetector 104 is operable to measure light according to one or more discrete points in time. In some cases, the photodetector 104 is operable to measure light continuously, periodically, intermittently, or according to some other pattern.

The electronic control device 106 also can control the operation of the photodetector 104. For example, the electronic control device 106 can be communicatively coupled to the photodetector 104, and selectively turn on or off the photodetector 104 (e.g., to measure light during selected periods of time, such as during a measurement operation). Further, the electronic control device 106 can obtain information describing the characteristics of the measured light (e.g., the time at which the light is measured, the intensity of the measured light, the spectral composition of the measured light, the phase of the measured light, etc.).

Figure 2:
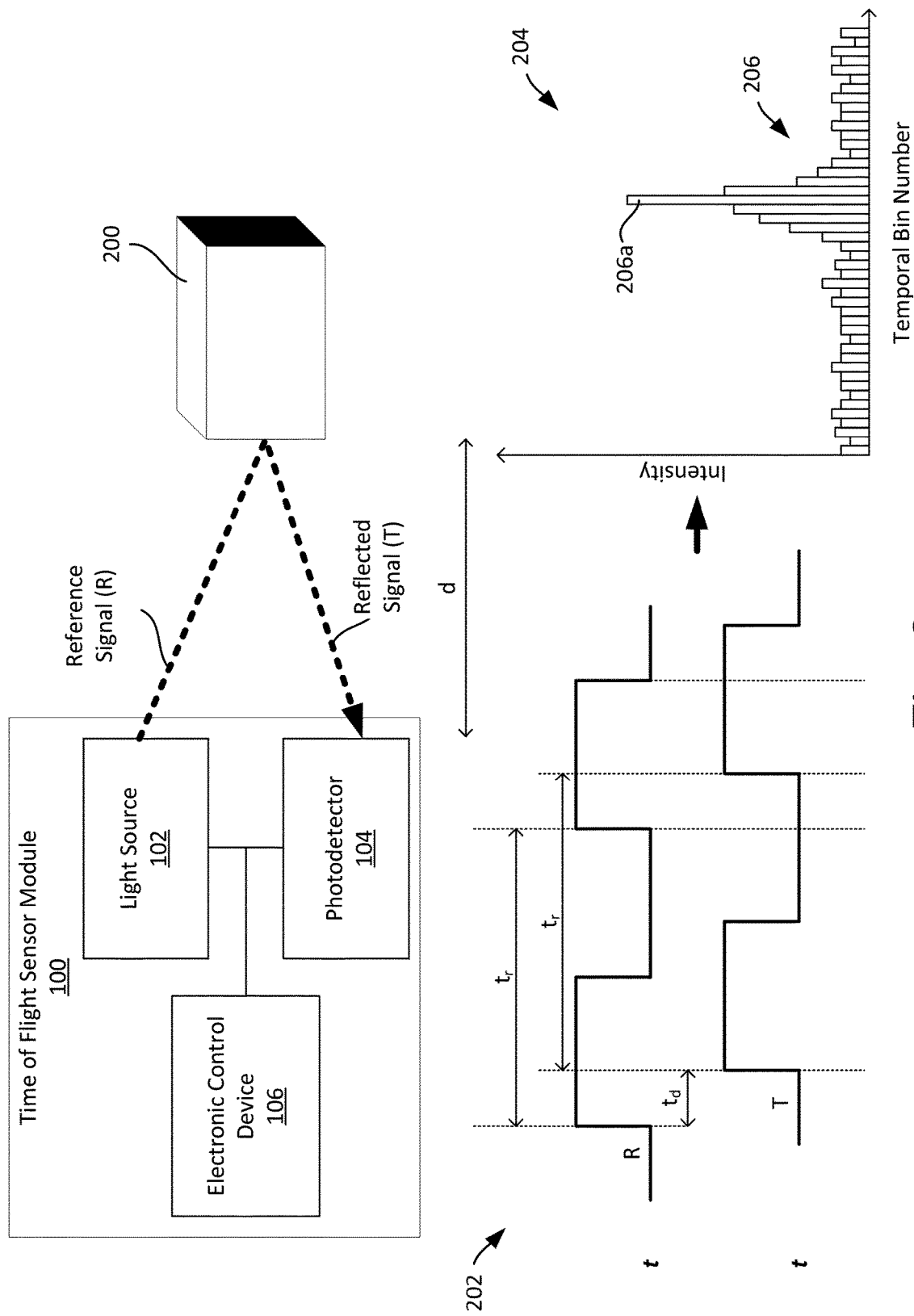
FIG. 2 is a diagram showing an example usage of a time-of-flight sensor module.

The electronic control device 106 can determine information regarding the subject (e.g., the distance between the object and the sensor module 100 and/or the physical structure of the object) based on information regarding the emitted light and the returning light. To illustrate, FIG. 2, shows an example usage of the sensor module 100. In this example, the sensor module 100 is in proximity to an object 200.

The light source 102 is operable to generate light in the form of a reference signal R (e.g., based on instructions from the electronic control device 106), which is directed toward the object 200. At least some of the emitted light reflects from the object 200 and returns to the photodetector 104 in the form of a reflected signal T. The photodetector 104 measures the reflected signal T, and transmits information regarding the measurements to the electronic control device 106.

The electronic control device 106 is operable to determine the distance d between the object 200 and the sensor module 100 based on information regarding the reference signal R and the reflected signal T. As an example, FIG. 2 shows a time-domain plot 202 of the reference signal R and the reflected signal T. The reference signal R is a periodic signal (e.g., a modulated signal) having a period $t_r$. The reflected signal T is also a periodic signal having a period $t_r$. However, the phase of the reflected signal T differs from the phase of the reference signal R, as indicated by a time shift $t_d$ between the reflected signal T and the reference signal R.

The difference in phase φ between the reference signal R and the reflected signal T varies according to the distance d. Accordingly, the distance d can be estimated by determining the difference in phase φ based on a known relationship between them. In some cases, the distance d is approximately proportional to the phase φ (e.g., the distance d can be estimated using the equation d≈k*φ, where k is an empirically or theoretically determined constant). In some cases, the distance d is estimated using the equation:

$$d = c/2f \cdot \phi/2\pi,$$

where f is the modulation frequency, and c is the speed of light.

In some cases, the distance d is estimated by repeatedly measuring the intensity of light over a period of time, and binning each of the measurements according to a number of temporal bins in a histogram based on the time that which the measurement was obtained. The distance d can be estimated based on composition of the histogram.

As an example, the sensor module 100 can repeatedly measure the intensity of light over a period of time $t_{start}$ (e.g., corresponding to the beginning of light emission by the light source 102) to $t_{end}$, and bin each of the measurements according to n temporal bins based on the time that which the measurement was obtained (e.g., $t_{start}$ to $t_1$, $t_1$ to $t_2$, ..., $t_{n-1}$ to $t_{end}$). The temporal bins can be evenly spaced, such that each temporal bin represents the same (or substantially the same) length of time (e.g., $t_1 - t_{start} = t_2 - t_1 = \ldots = t_{end} - t_{n-1}$).

If the object is close to the sensor module 100, the intensity of reflected light is expected to be higher in the earlier temporal bins (e.g., due to a shorter path of travel for light between the sensor and the object, the reflected light is expected to return sooner to the sensor module 100). However, if the object is relatively further from the sensor module 100, the intensity of reflected light is expected to be higher in the later temporal bins (e.g., due to a longer path of travel for light between the sensor and the object, the reflected light is expected to return later to the sensor module 100). Each temporal bin can be associated with a respective distance. Accordingly, the distance d can be determined by identifying the temporal bin with the highest intensity value (e.g., indicating that the most light returned to the sensor module 100 during a certain period of time), and determining the corresponding distance associated with that temporal bin.

To illustrate, FIG. 2 shows an example histogram 204 representing intensity measurements of a reflected signal T obtained by the photodetector 104. The histogram 204 includes a number of temporal bins 206, where the height of each temporal bin 206 represents the intensity of light measured during a particular period of time. Further, each temporal bin 206 is associated with a particular distance value. Accordingly, the distance d can be determined by identifying the temporal bin with the highest intensity value (e.g., temporal bin 206a), and determining the corresponding distance associated with that temporal bin.

The distance resolution of the sensor module 100 depends, at least in part, on the sensor module's ability to determine the elapsed time between the emission of light of and the return of reflected light precisely. For example, if the sensor module 100 measures time according to a low degree of precision, the sensor module 100 can only bin measurements according to a low temporal resolution (e.g., using temporal bins having greater temporal spans). Accordingly, the sensor module 100 resolves the distance d according to a low degree of precision. However, if the sensor module 100 is able to measure time according to a higher degree of precision, the sensor module 100 can bin measurements according to a higher temporal resolution (e.g., using temporal bins having a smaller temporal width). Accordingly, the sensor module 100 can resolve the distance d according to a higher degree of precision. In practice, timekeeping components having higher temporal resolutions are often more expensive and/or complex to produce. Accordingly, during the design process of the sensor module 100, the distance resolution of sensor module 100 is often balanced against practical considerations (e.g., the expense and/or complexity of components used in the sensor module 100).

Figure 3A:
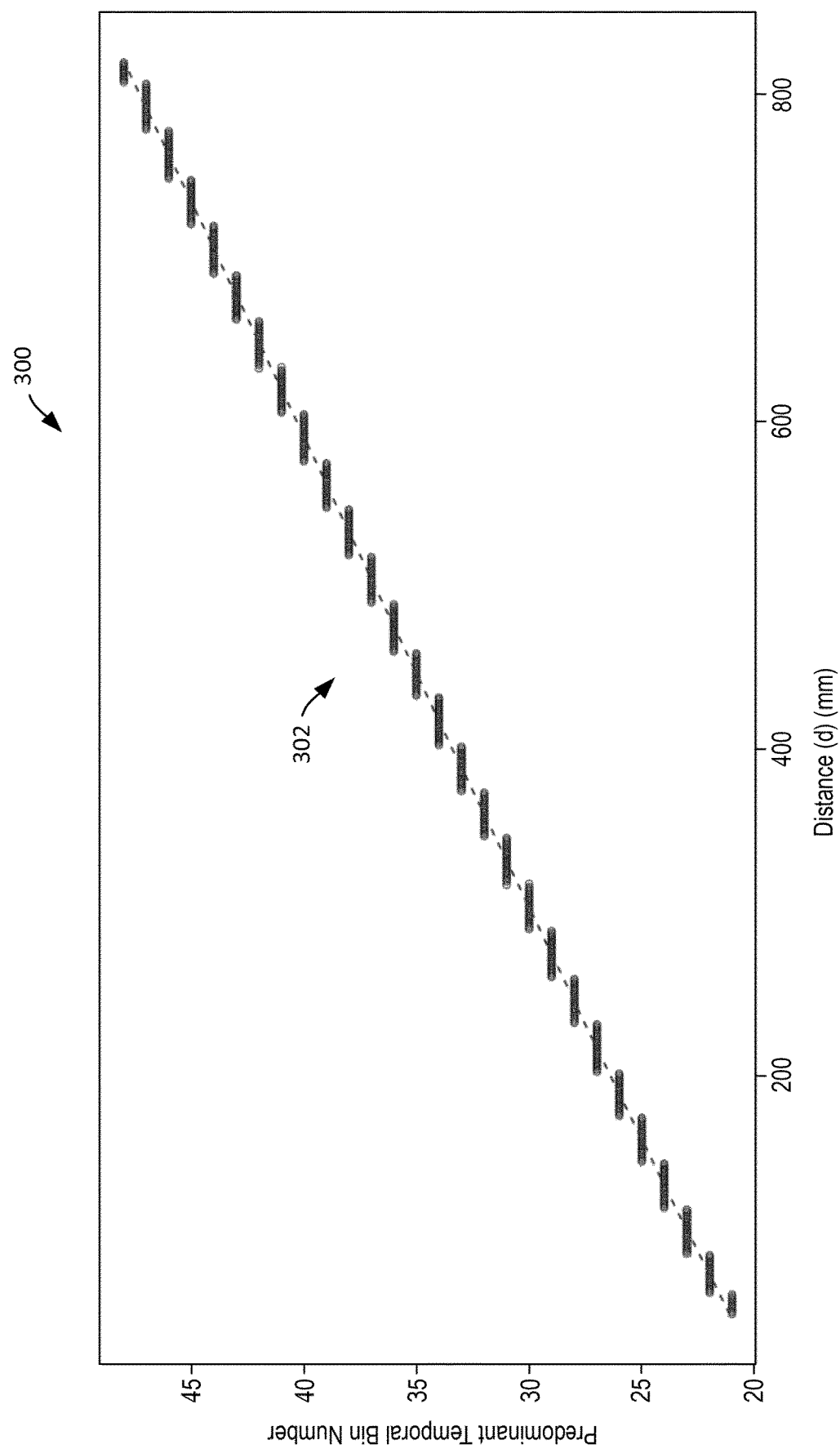
FIG. 3A shows a plot depicting an example relationship between the "predominant" temporal bins of a histogram and the distance between an object and a sensor module.

FIG. 3A shows a plot 300 depicting an example relationship between the "predominant" temporal bins of a histogram (e.g., the temporal bin corresponding to the highest intensity measurements) and the distance d between the object 200 and the sensor module 100. Each point 302 in the plot 300 shows the correlation between a particular predominant temporal bin and a respective distance d. In general, the distance d is proportional to the number of the predominant temporal bin (e.g., as the distance d increases, the elapsed time for the return of reflected light increases as well, corresponding to an increase in the predominant temporal bin number). However, due to the temporal resolution of the sensor module 100 and the temporal width of the temporal bins, each temporal bin corresponds to a range of different distance values, rather than a single distance value. Accordingly, the sensor module's 100 is limited to resolving distances according to a particular resolution (e.g., corresponding to the step-like arrangement of the points 302).

The distance resolution of the sensor module 100 can be enhanced by interpolating a distance estimate based on the measured intensities of multiple different temporal bins, rather than just a single temporal bin. In some cases, this is determined by first identifying a particular predominant temporal bin and a respective distance d (e.g., in a similar manner as described above with respect to FIG. 2). Subsequently, the distance d can be offset by a particular offset distance $d_{offset}$ based on a calculated measurement parameter m. The measurement parameter m can be determined based on the intensity of the predominant temporal bin, and the intensities of one or more other temporal bins adjacent to or in proximity to the temporal bin.

Figure 3B:
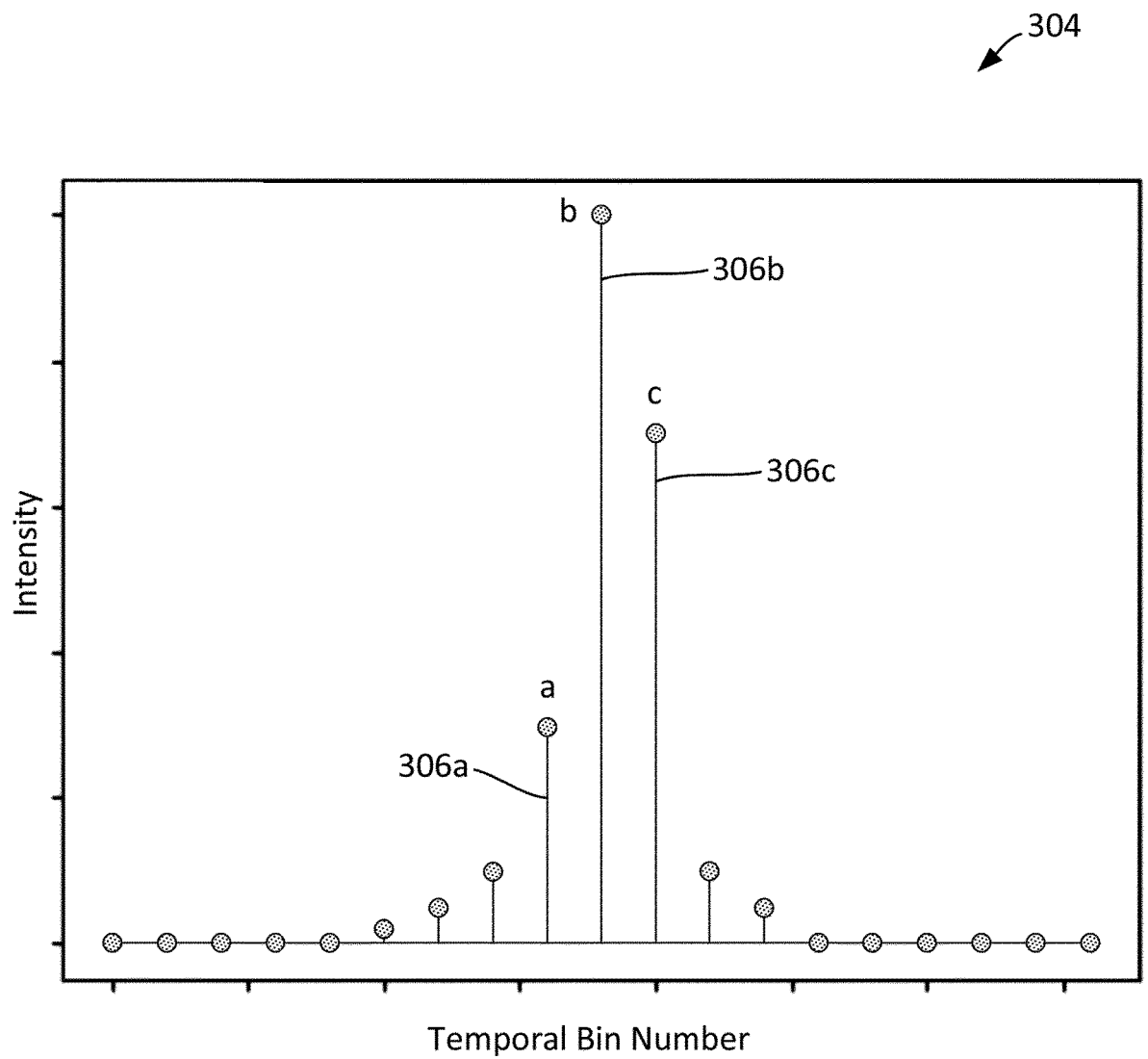
FIG. 3B shows an example histogram representing intensity measurements binned according to temporal bins.

To illustrate, FIG. 3B shows an example histogram 304. The histogram 304 can be generated in a similar manner to that described above with respect to FIG. 2. For ease of illustration, only a subset of the temporal bins 306 of the histogram 304 are shown. In this example, a temporal bin 306b is the predominant bin (corresponding to the temporal bin with the highest intensity value), while temporal bins 306a and 306c are directly adjacent to the temporal bin 306b (corresponding to the temporal bins closest in time to the temporal bin 306b).

A measurement parameter m can be calculated based on the intensity values of the temporal bins 306a-c. As an example, the measurement parameter m can be determined based on the equation:

$$m=(c-a)/(b-\min(c,a)),$$

where a is the intensity value of the temporal bin 306a, b is the intensity value of the temporal bin 306b, and c is the intensity value of the temporal bin 306c. Further, min (c, a) represents the lesser of the values a and c.

The measurement parameter m can be used to determine an offset distance $d_{offset}$ from the distance d, such that the adjusted distance estimate $d_{adjusted}$ is:

$$d_{adjusted}=d+d_{offset}$$

This enables the sensor module 100 to interpolate distance estimates with a degree of precision beyond what would otherwise be possible due to the temporal resolution limitations of its timekeeping components.

Figure 3C:
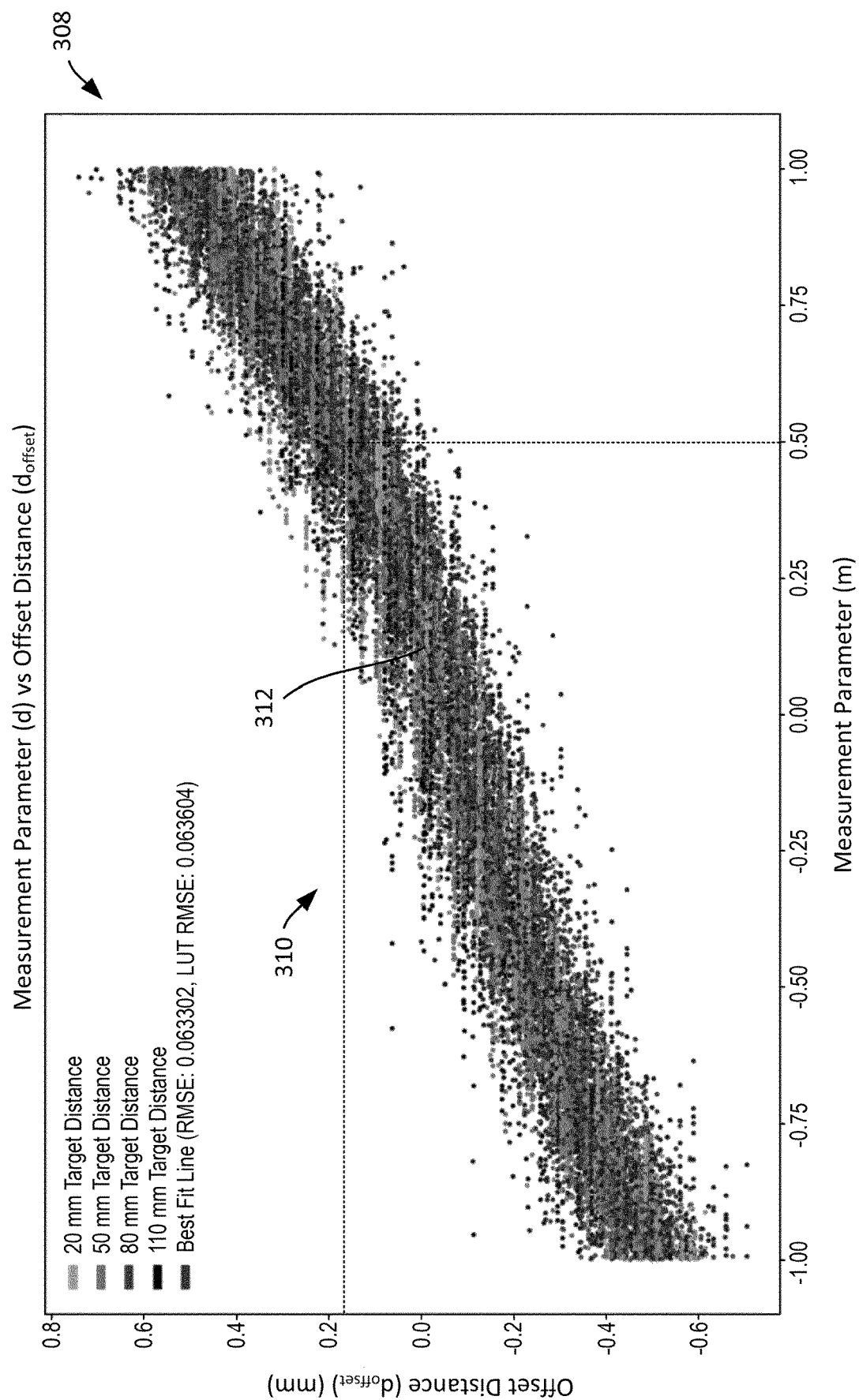
FIG. 3C shows a scatter plot indicating an example relationship between a measurement parameter and an offset distance.

In some cases, the measurement parameter m is proportional (or substantially proportional) to the offset distance $d_{offset}$. As an example, FIG. 3C shows a scatter plot 308 showing an example relationship between the measurement parameter m (indicated by the horizontal axis) and the offset distance $d_{offset}$ (indicated by the vertical axis). Each point 310 on the scatter plot 308 shows the result of an experimental measurement in which an object was placed at a particular distance from the sensor module 100, and a distance measurement was conducted using the sensor module 100. For each point 310, its value along the horizontal axis represents the calculated measurement parameter m, while its value along the vertical axis represents the actual offset distance $d_{offset}$ (e.g., as physically measured by an technician). Lighter points 310 represent objects that were placed closer to the sensor module 100, while darker points 310 represent objects that were placed further from the sensor module 100. As shown in FIG. 3C, the measurement parameter m is substantially proportional to the offset distance $d_{offset}$ regardless of the object's distance from the sensor module 100. Further, the relationship between the measurement parameter m and the offset distance $d_{offset}$ is monotonic. This relationship can be approximated, for example, using a trend line 312. In some cases, the offset distance $d_{offset}$ is calculated using the measurement parameter m and the trend line 312. In some cases, the offset distance $d_{offset}$ is calculated using the measurement parameter m and a look up table (e.g., a look up table indicating an offset distance $d_{offset}$ based on a given measurement parameter m).

In an example distance estimation, the sensor module 100 identifies a predominant temporal bin based on a binned histogram of intensity measurements of reflected light. The sensor module 100 identifies a distance d corresponding to the predominant temporal bin (e.g., 100 mm). Further, the sensor module 100 calculates the measurement parameter m based on the intensities of the predominant temporal bin and the adjacent temporal bins (e.g., 0.50), and determines the corresponding offset distance $d_{offset}$ (e.g., 0.18 mm, as shown in FIG. 3C). Accordingly, the adjusted distance estimate $d_{adjusted}$ is 99.82 mm (i.e., 100 mm-0.18 mm). Although example values are discussed above, it is understood that these values are merely illustrative. In practice, each of the values, as well as the relationship between them, can differ, depending on the implementation.

In the examples shown above, the intensity values of three temporal bins are used to determine an offset distance $d_{offset}$. However, in practice, one or more additional temporal bins can be considered when determining an offset distance $d_{offset}$. As an example, the intensity values of five, seven, nine, or more temporal bins can be used to determine an offset distance $d_{offset}$ (e.g., the intensity of the predominant bin and the two closest temporal bins on each side, the intensity of the predominant bin and the three closest temporal bins on each side, etc.). For instance, a measurement parameter m can be determined based on an equation having the intensity values of five, seven, nine, or more temporal bins as inputs. The equation can be determined, for example, based on multiple linear regression, polynomial regression, or other statistical formulas derived from machine learning models (e.g., artificial neural networks and/or random forests). Further, the measurement parameter m can be used to determine an offset distance $d_{offset}$ from the distance d (e.g., in a similar manner as described above).

In some cases, a sensor module 100 emits a pulse of light towards an object, and determines a shape of the signal waveform that returns (e.g., representing the reflected pulse of light). The shape of the returning signal waveform will differ, depending on the distance between the sensor module 100 and the object, and depending on the physical structure of the object (e.g., due to differences in the way that the object reflects the pulse of light). Accordingly, the sensor module 100 can determine information regarding the distance between the sensor module 100 and the object and the physical structure of the object (e.g., its shape, profile, reflectivity, features, etc.) based on the shape of the signal waveform.

In some cases, a sensor module 100 obtains multiple measurements of an object, and generates an interpolated signal waveform representing that object based on the measurements. The interpolated signal waveform can be similar to the measured reflected pulses, but can exhibit a lesser degree of noise and/or represent a greater degree of information than a single measured pulse alone. In some cases, the interpolated signal waveform is used to determine the distance between the sensor module 100 and the object and/or the physical structure of the object according to a higher resolution than using a single measured pulse alone. In some cases, the interpolated signal waveform is used to determine the distance between the sensor and the object more precisely in future measurements.

The interpolated signal waveform can be generated by emitting light towards an object positioned at a known distance from the sensor module 100, measuring the intensity of light reflecting from the object, and binning the measurements according to a number of temporal bins (e.g., corresponding to periods of time during which the measured light returned to the sensor). This measurement process can be repeated several times with respect to multiple different object distances (e.g., by repositioning the object at a different known distance from the sensor, and repeating the measurement process). An interpolated signal waveform representing the object can be determined based on the binned measurements.

Figure 4A:
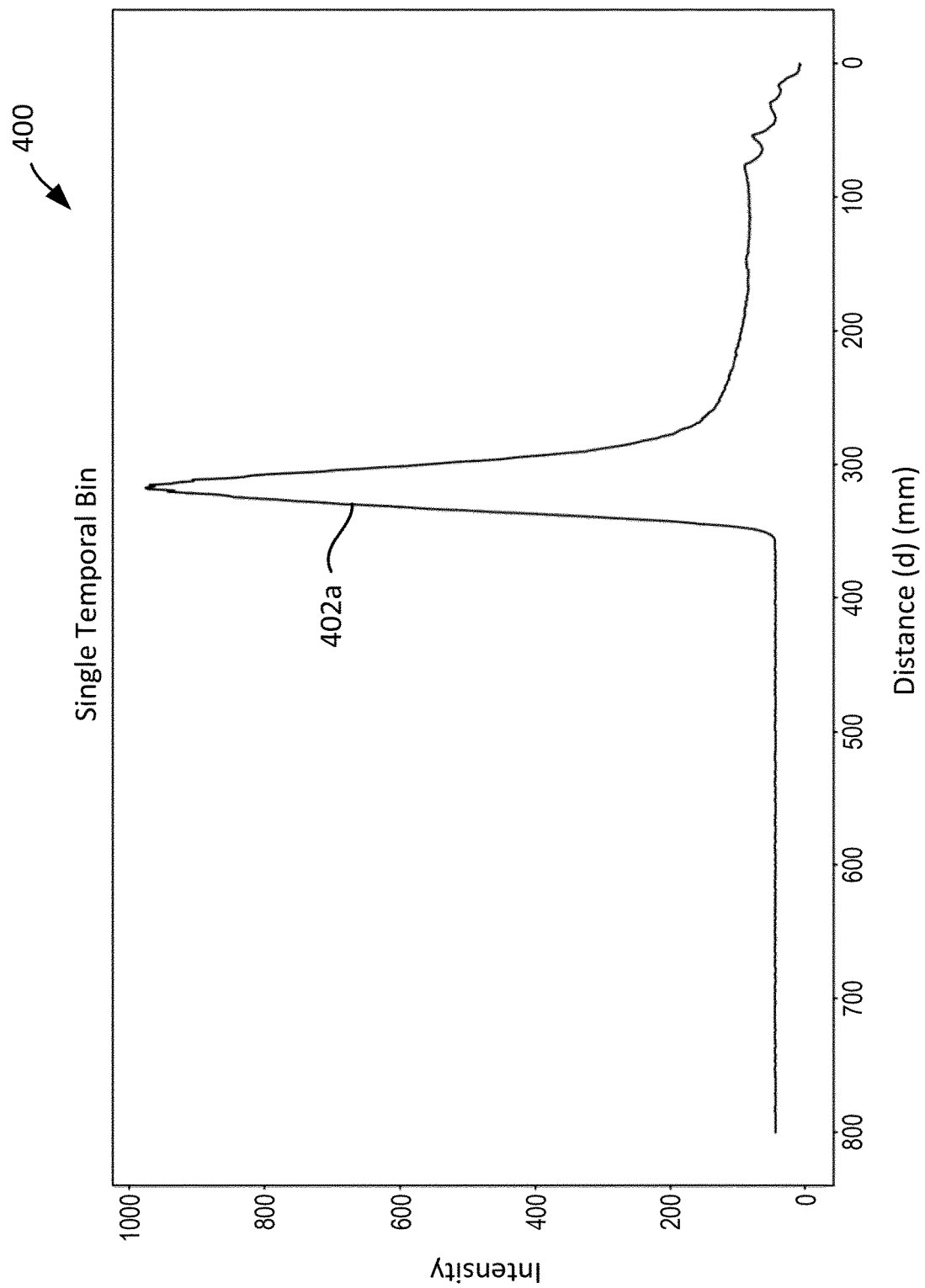
FIG. 4A shows a histogram representing intensity measurements for a single temporal bin with respect to several different object positions.

For instance, an object can be positioned at 800 different distances from the sensor module 100 (e.g., 1 mm to 800 mm from the sensor module 100, in 1 mm increments). The sensor module 100 can generate a set of measurements for each distance by generating modulated light using a light source of the sensor module (e.g., one or more pulses of light), directing the modulated light towards the object, and measuring an intensity of modulated light reflected from the object towards the photodetector over a period of time. The measured intensity of the reflected modulated light can be binned according to a number of temporal bins. As an example, FIG. 4A shows a histogram 400 representing intensity measurements for a single temporal bin with respect to each of the different object positions (indicated by a plot 402a). In this example, the temporal bin's intensity is relatively low for object distances of approximately 0 to 275 mm, increases sharply to a peak at an object distance of approximately 300 mm, and decreases sharply as the object distance increases beyond 300 mm.

Figure 4B:
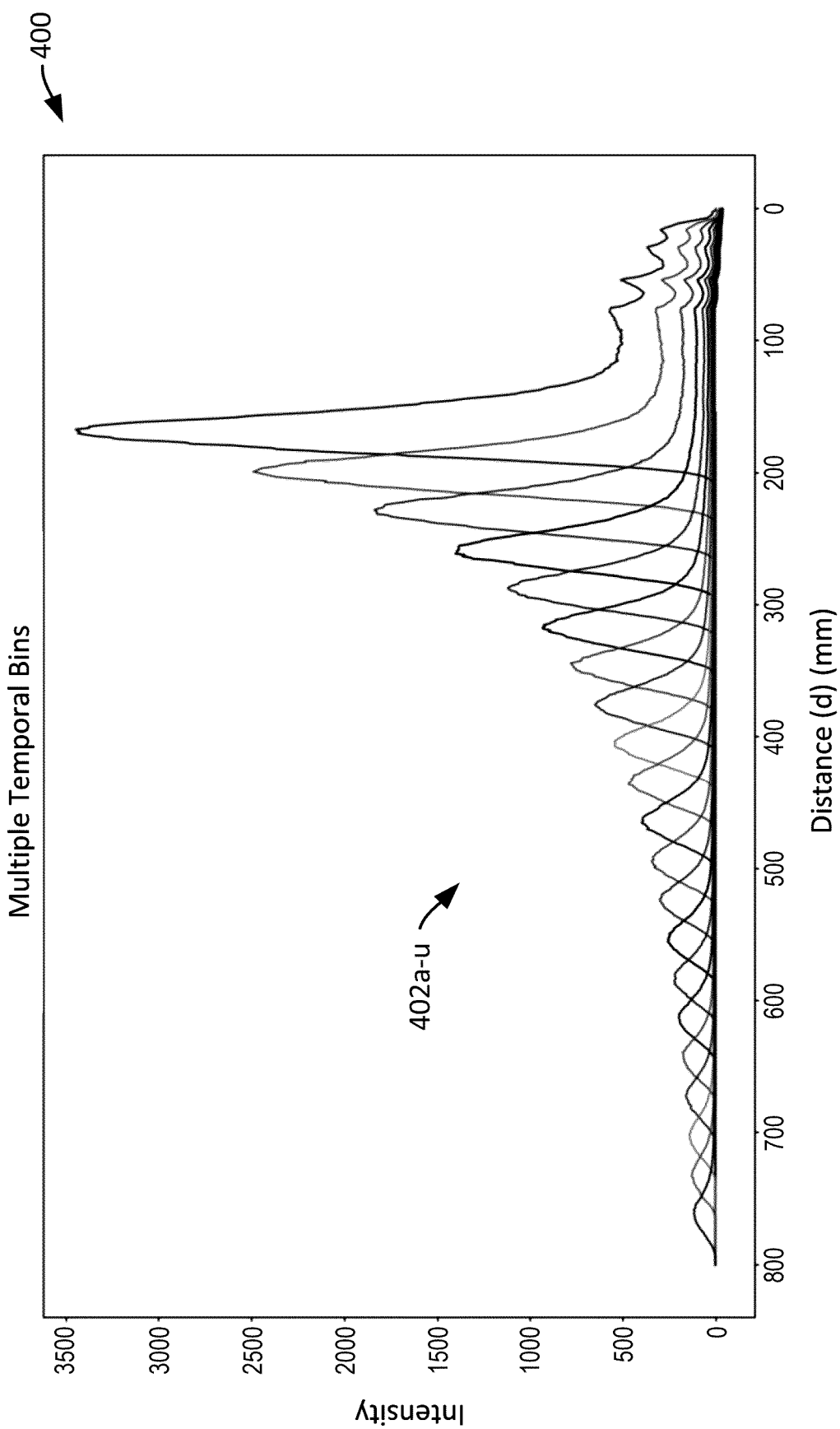
FIG. 4B shows a histogram representing intensity measurements for multiple temporal bins with respect to several different object positions.

Similar histograms can be generated for each of the temporal bins. As an example, FIG. 4B shows a histogram 400 representing intensity measurements for 21 temporal bin with respect to each of the object positions (each indicated by a different overlaid plot 402a-u). Although 21 temporal bins are shown, this is merely an illustrative example. In practice, intensity measurements can be binned according to any number of temporal bins, depending on the implementation. For example, in some cases, intensity measurements are binned according to 128 temporal bins.

Figure 4C:
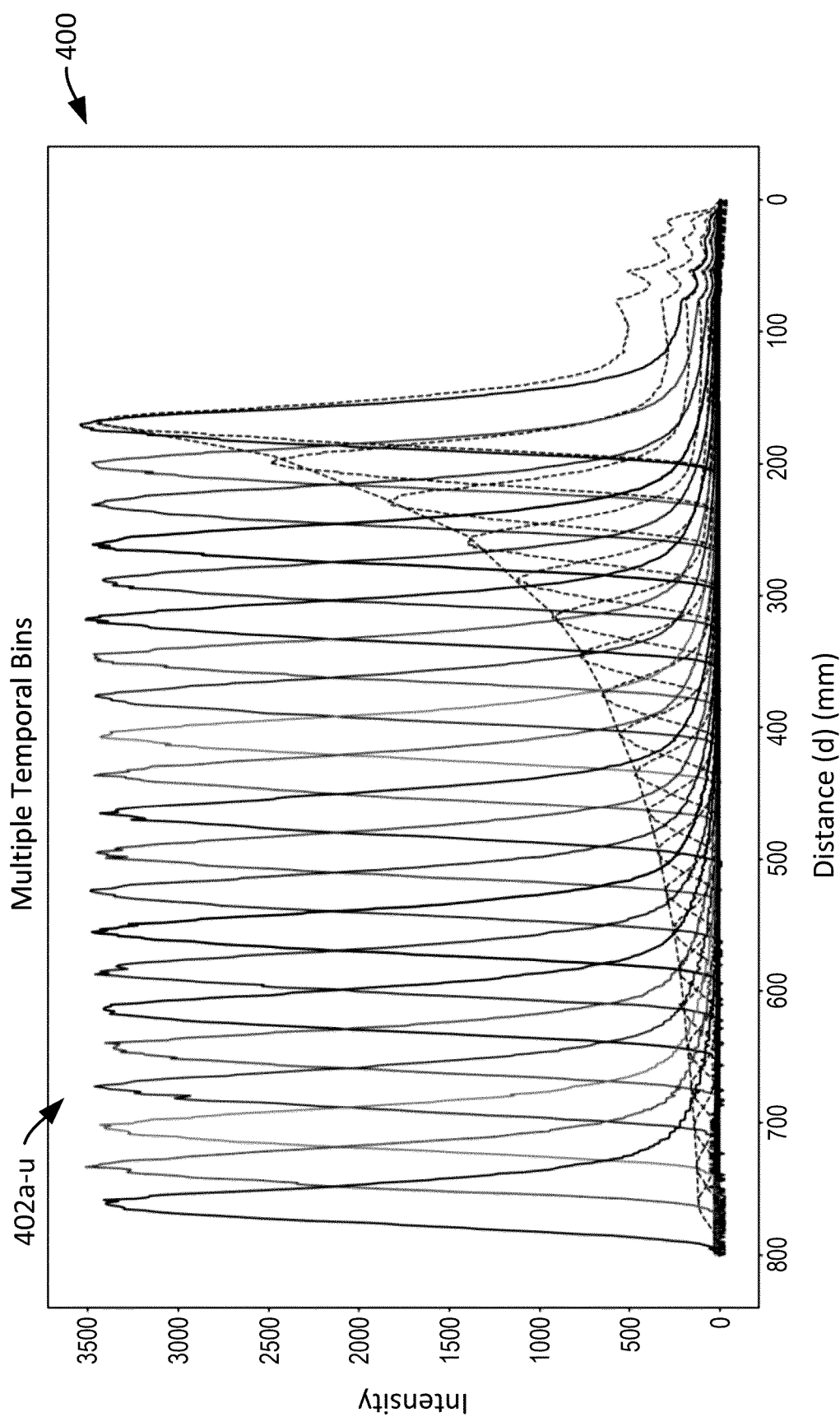
FIG. 4C shows normalized plots representing each of the temporal bins of measurements.

As shown in FIG. 4B, each of the plots 402a-u exhibits a different peak intensity value. As shown in FIG. 4C, the plots 402a-u can be normalized such that their peak intensity values are equal or approximately equal. In some cases, plots are normalized by determining the peak value for each plot, and scaling each plot such that their peak intensity values are equal or approximately equal (e.g., scaling each plot such that their peak intensity values are equal to the greatest peak intensity value of the plots). In some cases, plots are normalized by determining a numerical regression for each plot (e.g., a polynomial regression or fit line), and multiplying each regression by the inverse of a scalar value, such that each of the regressions has a similar scale or numerical range. In practice, the plots can be normalized using other normalization techniques, depending on the implementation.

Figure 4D:
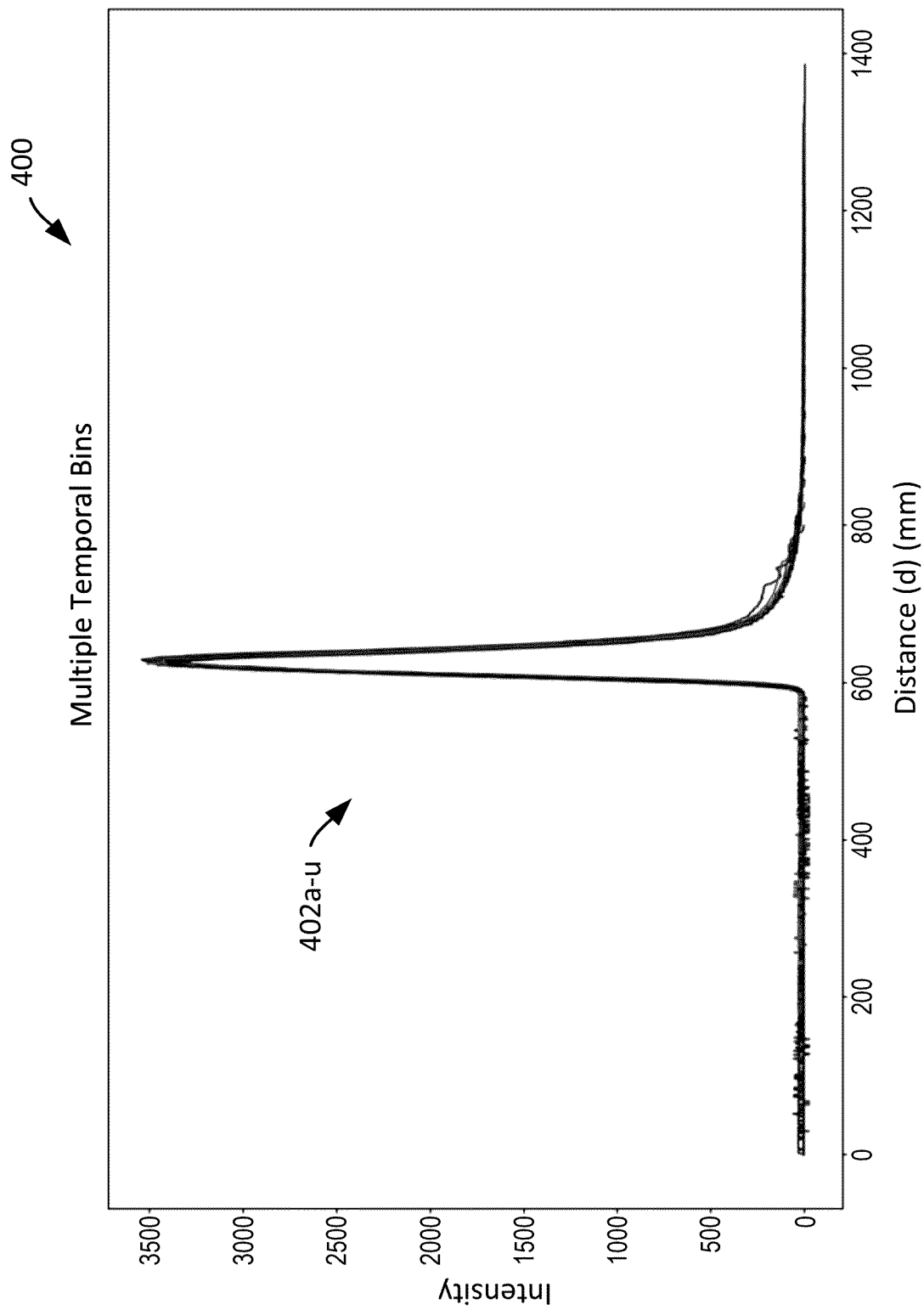
FIG. 4D shows aligned plots representing each of the temporal bins of measurements.

As shown in FIG. 4D, one or more of the plots 402a-u can shifted such that the plots 402a-e are aligned with one another. In some cases, plots are aligned by determining the peaks of each plot, and shifting one or more of the plots such that the peaks are aligned with one another (e.g., occurring at the same or substantially the same distance value). In some cases, plots are aligned by determining cross-correlations between different pairs of signals, and shifting one or more of the signals to maximize or substantially maximize the cross-correlations. In practice, the plots can be aligned using other alignment techniques, depending on the implementation.

Figure 4E:
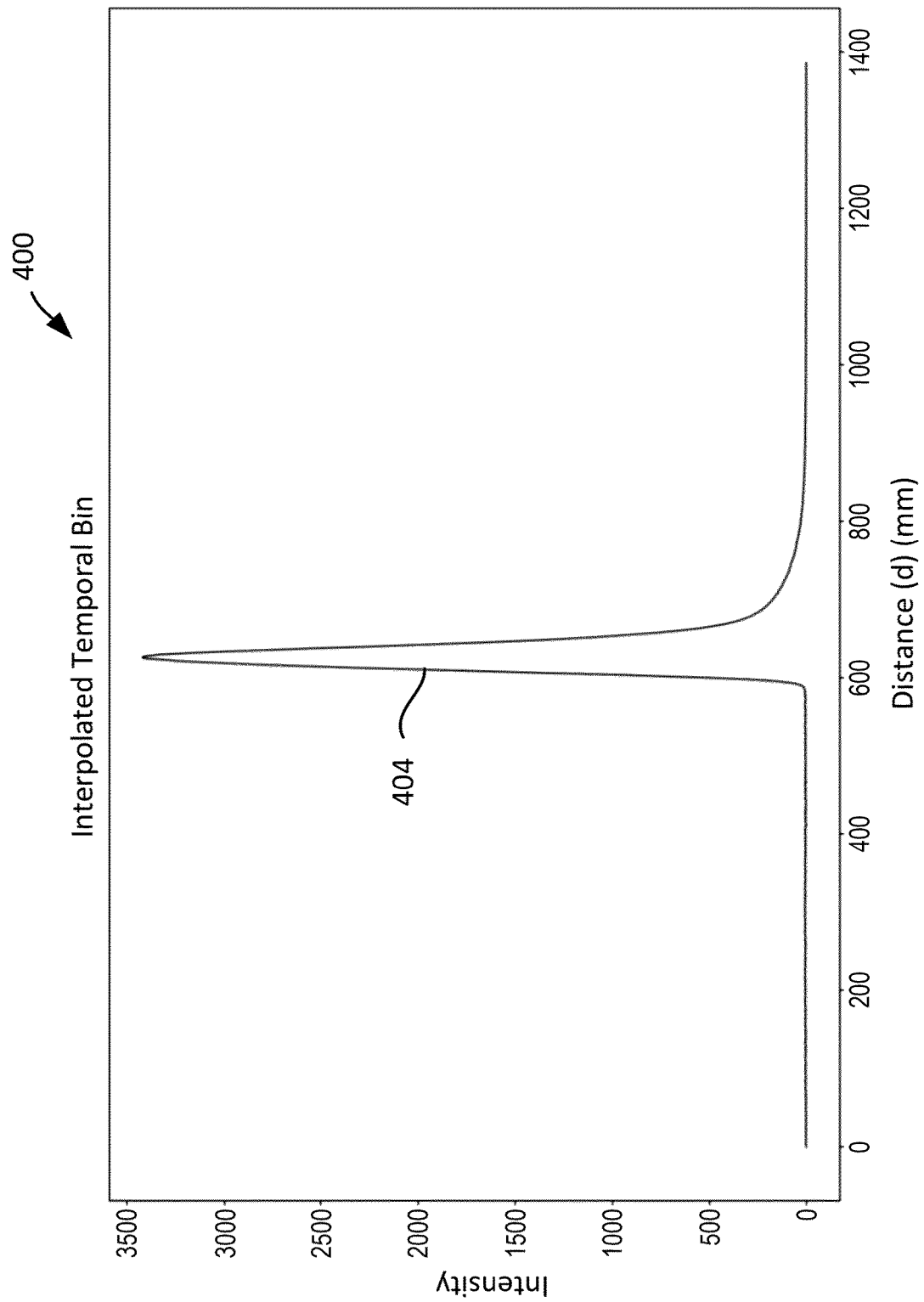
FIG. 4E shows an averaged plot representing the measurements.
Figure 4F:
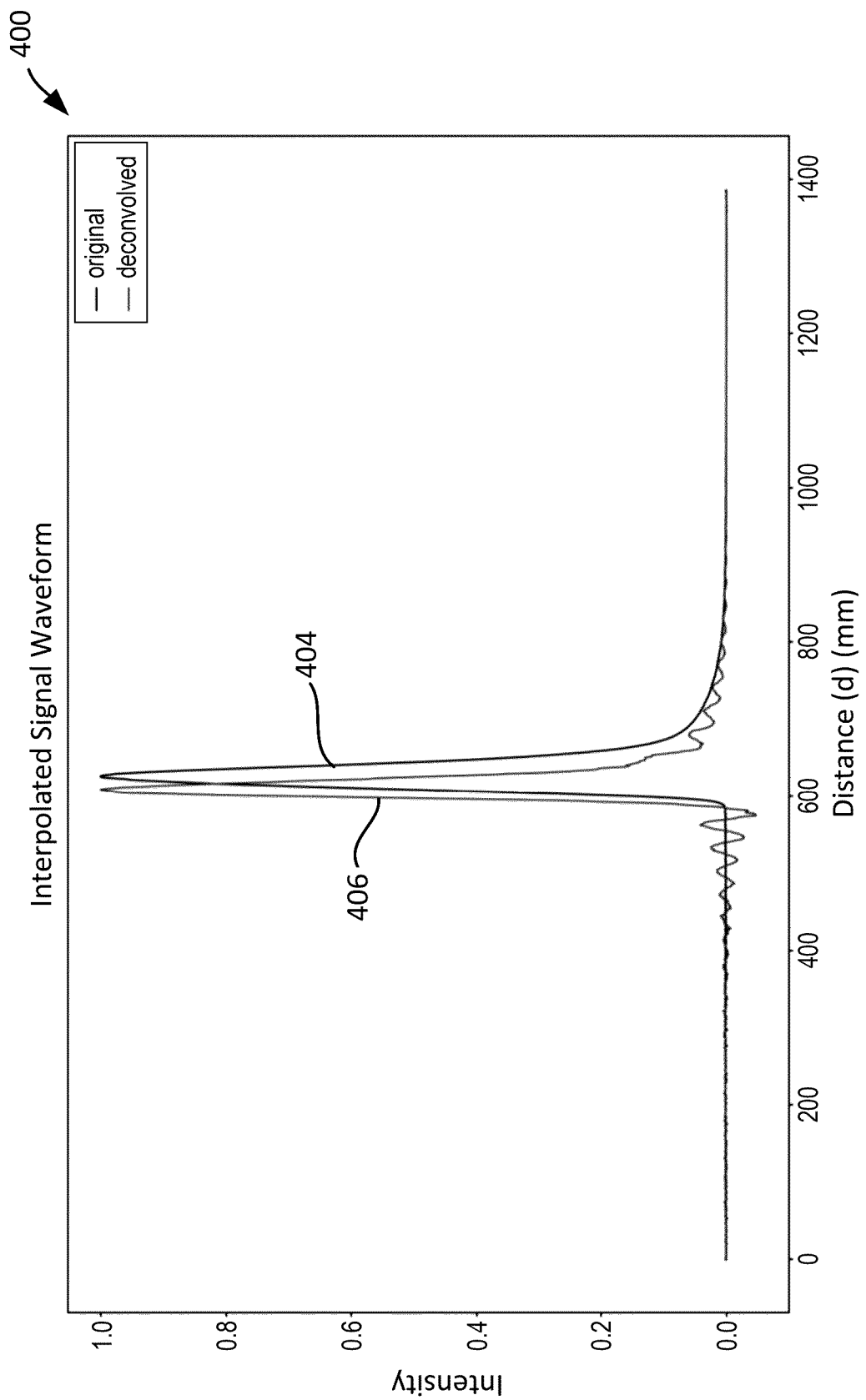
FIG. 4F shows an interpolated signal waveform representing an object.
Figure 5:
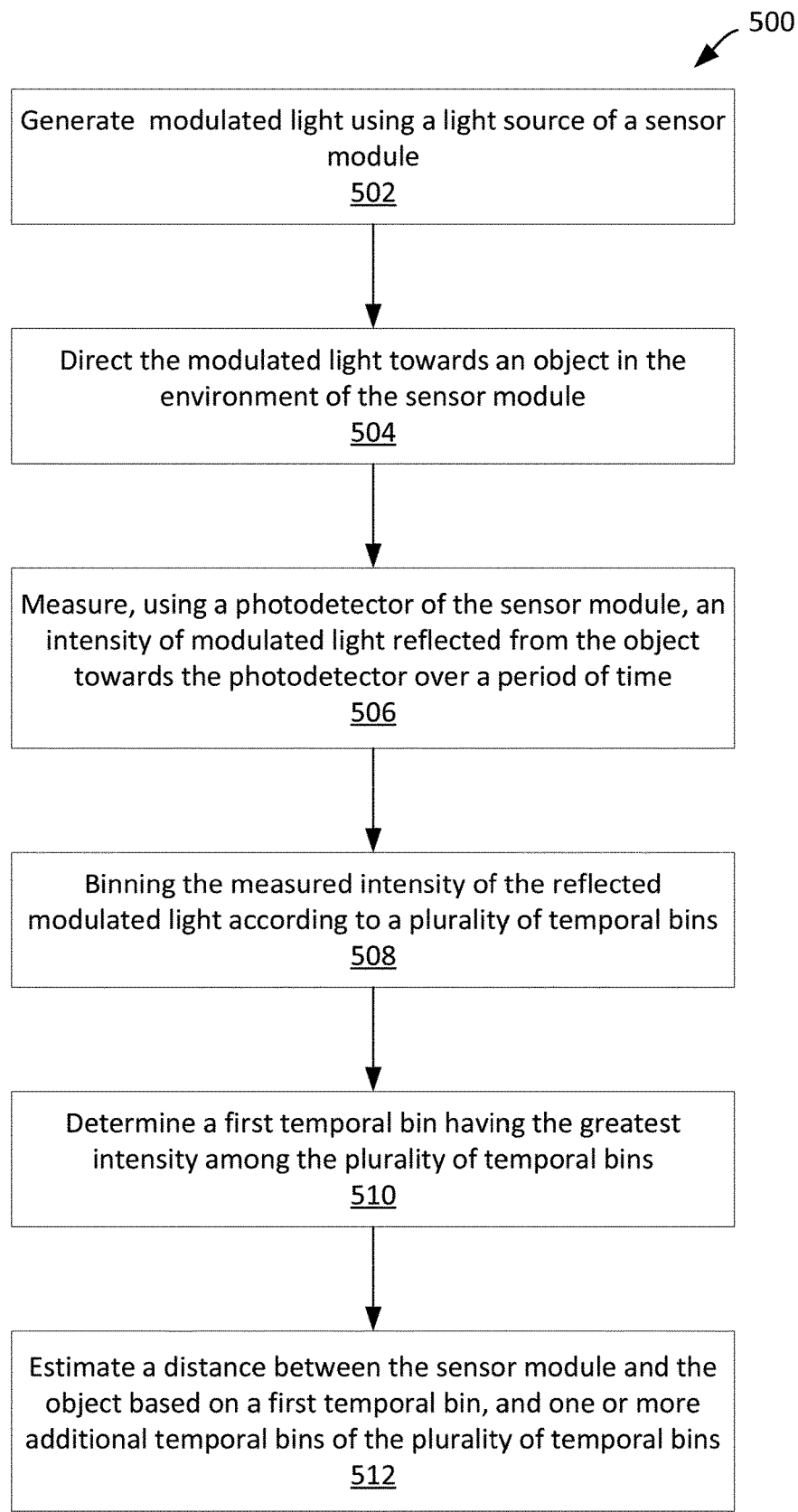
FIG. 5 shows an example process for obtaining measurements using a time-of-flight sensor module.
Figure 6:
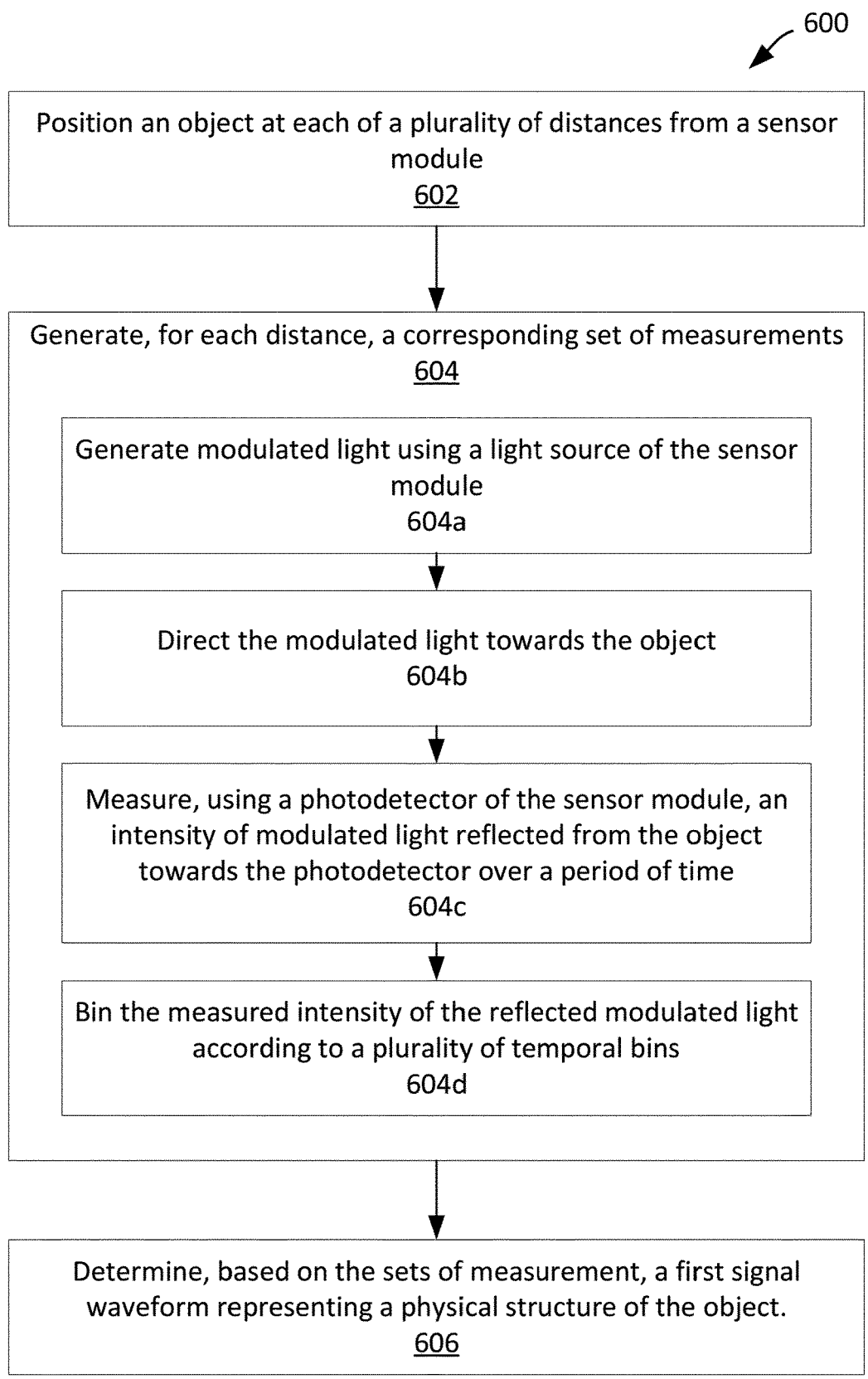
FIG. 6 shows another example process for obtaining measurements using a time-of-flight sensor module.

As shown in FIG. 4E, the plots 402a-u can be averaged together to determine an averaged plot 404. Further, as shown in FIG. 4F, the plot 404 can be deconvolved to form an interpolated signal waveform 406 representing the object. As an example, the plot 404 can be deconvolved by performing a Wiener deconvolution with a moving average window (e.g., a window having a width of 30 mm, or some other value).

In some cases, the interpolated signal waveform 406 is similar to a single measured reflected pulse, but exhibits a lesser degree of noise and/or represent a greater degree of information than a single measured pulse alone. In some cases, the interpolated signal waveform is used to determine the distance between the sensor module 100 and the object and/or the physical structure of the object according to a higher resolution than using a single measured pulse alone. In some cases, the interpolated signal waveform is used to determine the distance between the sensor and the object more precisely in future measurements.

In the example shown in FIG. 4A-4E, an object is positioned and measured at 800 different locations. However, in practice, an object can be positioned and measured at any number of different locations. For example, an object can be positioned and measured at more than 800 different locations (e.g., to increase the quality of the interpolated signal waveform). As another example, an object can be positioned and measured at fewer than 800 different locations (e.g., to decrease the amount of time and effort to generate the interpolated signal waveform). Further, although the object is positioned between 1 mm and 800 mm away from the sensor module 100 in FIGS. 4A-4E, in practice, the object can be positioned according to any range of distances from the sensor module 100.

FIG. 500 illustrates an example process 500 for obtaining measurements using a time-of-flight sensor module. Some or all of the process 500 can be performed, for example, using the sensor modules 100 and/or host devices described herein.

In the process 500, modulated light is generated using a light source of a sensor module (step 502). The modulated light is directed towards an object in the environment of the sensor module (step 504). Optics such as one or more lenses may be provided for this purpose. Using a photodetector of the sensor module, an intensity of modulated light reflected from the object towards the photodetector over a period of time is detected (step 506). The sensor module can include a time of flight sensor module. The light source can include, for example, a laser emitter. The photodetector can include, for example, a photodiode. Example techniques for generating modulated light, emitting modulated light, and measuring modulated light are described, for example, with respect to FIG. 2.

Using an electronic control device, the measured intensity of the reflected modulated light is binned according to a plurality of temporal bins (step 508). In some cases, each temporal bin corresponds to a respective different distance between the sensor module and the object. Example techniques for binning intensity measurements are described, for example, with respect to FIG. 2.

Using the electronic control device, a first temporal bin having the greatest intensity among the plurality of temporal bins is determined (step 510). Further, a distance between the sensor module and the object is estimated based on a first temporal bin, and one or more additional temporal bins of the plurality of temporal bins (step 512).

The distance can be estimated by determining a distance offset with respect to the distance corresponding to the first temporal bin. The distance offset can be less than a difference between the distance corresponding to the first temporal bin, and the distance corresponding to a second temporal bin temporally adjacent to the first temporal bin. Further, an intensity of a second temporal bin temporally adjacent to the first temporal bin can be determined. Further, an intensity of a third temporal bin temporally adjacent to the first temporal bin also can be determined. The second temporal bin can be different from the third temporal bin. Further example, the first temporal bin can correspond to a first time interval of the period of time, the second temporal bin can corresponds to a second time interval of the period of time prior to the first time interval, and the third temporal bin can correspond to a third time interval of the period of time subsequent to the first time interval.

Further, a measurement parameter m can be determined based on an intensity of the first temporal bin, the intensity of the second temporal bin, and the intensity of the third temporal bin. One or more data items indicating a relationship between a plurality of sample values of the measurement parameter m and a plurality of corresponding distance offsets can be obtained (e.g., data items describing a regression or trend line, a look up table, etc.). The distance between the sensor module and the object can be determined based on the measurement parameter m and the relationship. In some cases, the measurement parameter m is equal to (c−a)/(b−min (c, a), where a is the intensity of the second temporal bin, b is the intensity of the first temporal bin, and c is the intensity of the third temporal bin. In some cases, the relationship between the plurality of sample values of the measurement parameter and the plurality of corresponding distance offsets is a monotonic relationship. In some cases, the measurement parameter m is to determine an offset distance $d_{offset}$ from the distance d (e.g., the distance corresponding to the first temporal bin), such that the adjusted distance estimate $d_{adjusted}$ is:

$$d_{adjusted} = d + d_{offset}$$

This enables the sensor module 100 to interpolate distance estimates with a degree of precision beyond what would otherwise be possible due to the temporal resolution limitations of its timekeeping components. Example techniques for estimating the distance between the sensor module and the object are described in further detail, for example, with respect to FIGS. 3A-3C.

FIG. 600 illustrates another example process 600 for obtaining measurements using a time-of-flight sensor module. Some or all of the process 600 can be performed, for example, using the sensor modules 100 and/or host devices described herein.

In the process 600, an object is positioned at each of a plurality of distances from a sensor module (step 602). As an example, an object can be positioned in a range of distances from 1 mm to 800 mm, in 1 mm increments (e.g., as described with respect to FIGS. 4A-4F). In practice, other ranges and increments are also possible, depending on the implementation.

For each distance, a corresponding set of measurements is generated using the sensor module (step 604). Generating each set of measurements includes generating modulated light using a light source of the sensor module (step 604a), directing the modulated light towards the object (step 604b), using a photodetector of the sensor module to measure an intensity of modulated light reflected from the object towards the photodetector over a period of time (step 604c), and using an electronic control device to bin the measured intensity of the reflected modulated light according to a plurality of temporal bins (step 604d). The sensor module can include a time of flight sensor module. The light source can include, for example, a laser emitter. The photodetector can include, for example, a photodiode. Example techniques for generating modulated light, and measuring an intensity of reflected modulated light are described with respect to FIG. 2. Example techniques for binning intensity measurements are described with respect to FIGS. 4A and 4B.

A first signal waveform representing a physical structure of the object is determined based on the sets of measurement (step 606). The physical structure can be at least one of a size or a shape of the object. Example techniques for determining the first signal waveform are described with respect to FIGS. 4A-4F.

As an example, for each temporal bin, a second signal waveform representing an intensity of that temporal bin with respect to each of the distances of the plurality of distances can be determined (e.g., as described with respect to FIGS. 4A and 4B). An intensity of at least one second signal waveform can be normalized (e.g., as described with respect to FIG. 4C). The second signal waveforms can be aligned with one another (e.g., as described with respect to FIG. 4D). The second signal waveforms can be averaged to obtain an averaged second signal waveform (e.g., as described with respect to FIG. 4E). The averaged second signal waveform can be deconvolved to obtain the first signal waveform (e.g., as described with respect to FIG. 4F). Deconvolving the averaged second signal waveform can include performing a Wiener deconvolution with respect to the averaged second signal waveform.

Example Systems

Some implementations of the subject matter and operations described in this specification can be implemented in digital electronic circuitry, or in computer software, firmware, or hardware, including the structures disclosed in this specification and their structural equivalents, or in combinations of one or more of them. For example, in some implementations, one or more components of the electronic control devices 106 can be implemented using digital electronic circuitry, or in computer software, firmware, or hardware, or in combinations of one or more of them. As another example, in some implementations, the processes 500 and 600 can be performed using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

The sensor modules described herein can be integrated into host devices such as smartphones, laptops, wearable devices, other computers, robots, and automobiles. The host devices may include processors and other electronic components, and other supplemental modules operable to collect data (e.g., cameras, proximity sensors, etc.). Other supplemental modules may be included such as ambient lighting, display screens, automotive headlamps, and the like. The host devices may further include non-volatile memory where instructions for operating the IC devices, and in some instances the supplemental modules, are stored.

The sensor modules described herein can, in some instances, improve the performance of the host devices. For example, using the techniques described herein, a sensor module can obtain measurements that are more accurate and/or precise (e.g., compared to measurements conducted without the performance of the disclosed techniques). Further, the host device (e.g., a vehicle, a robot, a mobile device, etc.) can use these measurements to ascertain its surroundings more accurately, and more effectively adapt their operations based on this information.

Figure 7:
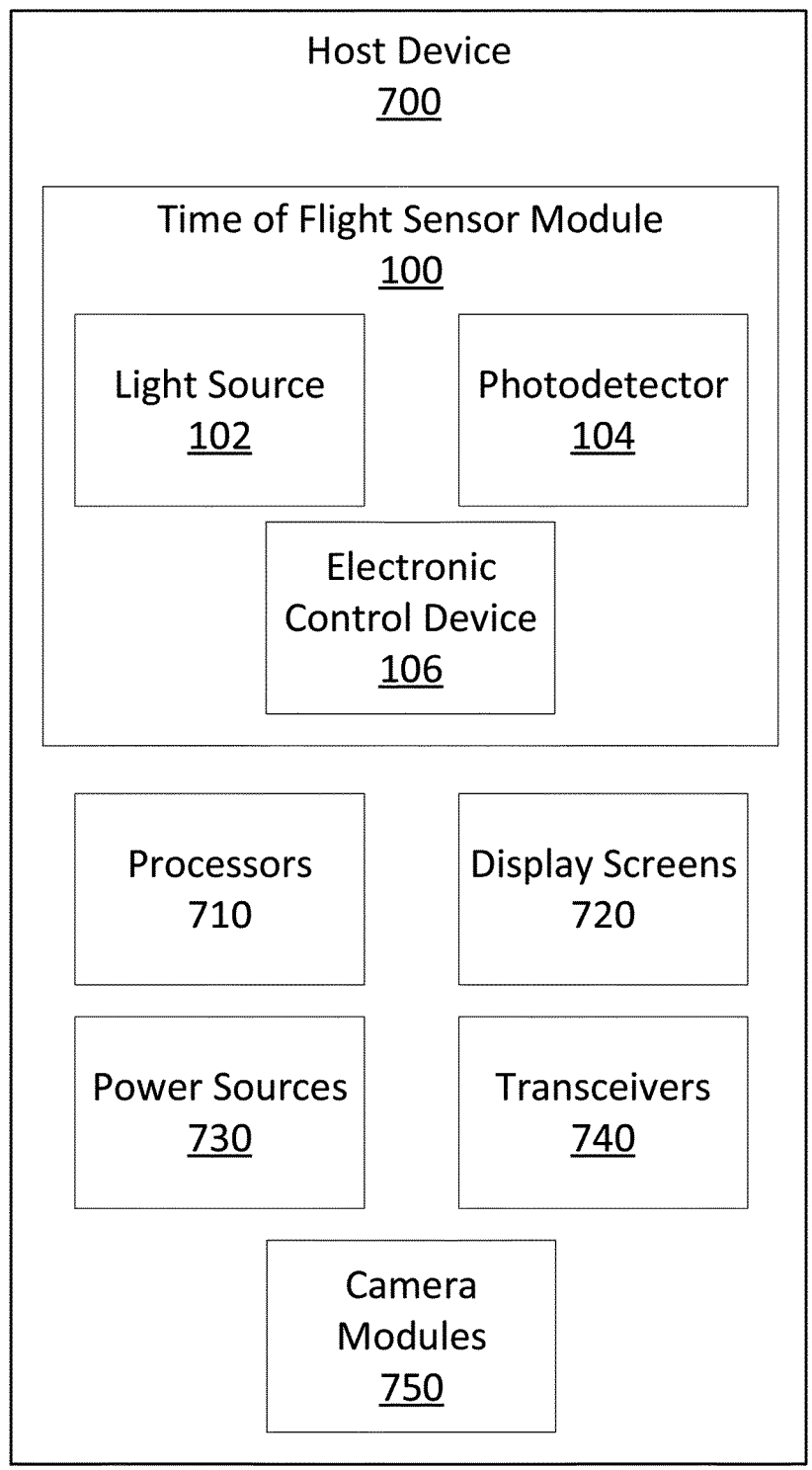
FIG. 7 shows an example host device having a time-of-flight sensor module.

As an example, FIG. 7 shows a host device 700 including a time-of-flight sensor module 100 (including a light source 102, a photodetector 104, and an electronic control device 106). The host device 700 also includes several additional components, including one or more computer processors 710 (e.g., to implement the electronic control device 106 and/or to provide other computation functions), one or more display screens 720, one or more power sources 730 (e.g., batteries, charging circuits, etc.), one or more transceivers 740 (e.g., a wireless radio, such a Wi-Fi radio, cellular radio, Bluetooth radio, etc.), and one or more camera modules 750 (e.g., imaging sensors, such as semiconductor charge-coupled devices [CCD], active pixel sensors in complementary metal-oxide-semiconductors (CMOS), and/or N-type metal-oxide-semiconductors [NMOS]). During operation of the host device 700, the host device 700 can obtain information regarding its surroundings (e.g., information regarding the presence of objects in proximity to the host device 700, and the distance of those objects from the host device 700) using the sensor module 100.

Further, the host device 700 can modify its operations based on the information based on by the sensor module 100. For instance, after determining the presence of an object and/or the distance between the object and the sensor module 100, the host device 700 can adjust a focus of one or more camera modules based on the estimated distance (e.g., to obtain clearer or sharper images of a detected object). As another example, the host device 700 can generate a map or other spatial representation of its environment, including information regarding the location of the object in the environment. As another example, the host device 700 can generate one or more graphical display elements that vary according the surrounding environment (e.g., an "augmented reality" graphical user interface including a video or image of the surrounding environment, and one or graphical overlays identifying objects in the video or image). Further still, the host device 700 can transmit information regarding the objects to one or more other devices (e.g., one or more other host devices), such that other devices also have access to the information.

While this specification contains many details, these should not be construed as limitations on the scope of what may be claimed, but rather as descriptions of features specific to particular examples. Certain features that are described in this specification in the context of separate implementations can also be combined in the same implementation. Conversely, various features that are described in the context of a single implementation can also be implemented in multiple embodiments separately or in any suitable sub-combination.

A number of embodiments have been described. Nevertheless, various modifications may be made without departing from the spirit and scope of the invention. Accordingly, other embodiments are within the scope of the claims.

The invention claimed is:
1. A system comprising:
 a sensor module comprising a light source and a photodetector; and
 an electronic control device,
 wherein the sensor module is operable to:
  generate modulated light using the light source, and
  measure, using the photodetector, an intensity of modulated light reflected from an object towards the photodetector over a period of time, and
 wherein the electronic control device is operable to:
  bin the measured intensity of the reflected modulated light according to a plurality of temporal bins,
  determine a first temporal bin having the greatest intensity among the plurality of temporal bins, and
  estimate a distance between the sensor module and the object based on a first temporal bin, and one or more additional temporal bins of the plurality of temporal bins,
 wherein estimating the distance comprises:
  determining an intensity of a second temporal bin temporally adjacent to the first temporal bin;
  determining an intensity of a third temporal bin temporally adjacent to the first temporal bin, wherein the second temporal bin is different from the third temporal bin;
  determining a measurement parameter based on an intensity of the first temporal bin, the intensity of the second temporal bin, and the intensity of the third temporal bin;

obtaining one or more data items indicating a relationship between a plurality of sample values of the measurement parameter and a plurality of corresponding sample distance offsets; and determining the distance between the sensor module and the object based on the measurement parameter and the relationship, wherein the measurement parameter is equal to $(c-a)/(b-\min(c,a))$, wherein a is the intensity of the second temporal bin, b is the intensity of the first temporal bin, and c is the intensity of the third temporal bin.

2. The system of claim 1, wherein each temporal bin corresponds to a respective different distance between the sensor module and the object.

3. The system of claim 1, wherein the electronic control device's estimating the distance between the sensor module and the object comprises determining a distance offset with respect to the distance corresponding to the first temporal bin.

4. The system of claim 3, wherein the distance offset is less than a difference between the distance corresponding to the first temporal bin, and the distance corresponding to a second temporal bin temporally adjacent to the first temporal bin.

5. The system of claim 1, wherein the first temporal bin corresponds to a first time interval of the period of time, wherein the second temporal bin corresponds to a second time interval of the period of time prior to the first time interval, and wherein the third temporal bin corresponds to a third time interval of the period of time subsequent to the first time interval.

6. The system of claim 1, wherein the relationship between the plurality of sample values of the measurement parameter and the plurality of corresponding sample distance offset is a monotonic relationship.

7. A method comprising:
generating modulated light using a light source of a sensor module;

measuring, using a photodetector of the sensor module, an intensity of modulated light reflected from an object towards the photodetector over a period of time;

binning the measured intensity of the reflected modulated light according to a plurality of temporal bins;

determining a first temporal bin having the greatest intensity among the plurality of temporal bins, and estimating a distance between the sensor module and the object based on a first temporal bin, and one or more additional temporal bins of the plurality of temporal bins, wherein estimating the distance comprises:

determining an intensity of a second temporal bin temporally adjacent to the first temporal bin;

determining an intensity of a third temporal bin temporally adjacent to the first temporal bin, wherein the second temporal bin is different from the third temporal bin;

determining a measurement parameter based on an intensity of the first temporal bin, the intensity of the second temporal bin, and the intensity of the third temporal bin;

obtaining one or more data items indicating a relationship between a plurality of sample values of the measurement parameter and a plurality of corresponding sample distance offsets; and determining the distance between the sensor module and the object based on the measurement parameter and the relationship, wherein the measurement parameter is equal to $(c-a)/(b-\min(c,a))$, wherein a is the intensity of the second temporal bin, b is the intensity of the first temporal bin, and c is the intensity of the third temporal bin.

8. The method of claim 7, wherein each temporal bin corresponds to a respective different distance between the sensor module and the object.

9. The method of claim 7, wherein estimating the distance between the sensor module and the object comprises determining a distance offset with respect to the distance corresponding to the first temporal bin.

10. The method of claim 9, wherein the distance offset is less than a difference between the distance corresponding to the first temporal bin, and the distance corresponding to a second temporal bin temporally adjacent to the first temporal bin.

11. The method of claim 7, wherein the first temporal bin corresponds to a first time interval of the period of time, wherein the second temporal bin corresponds to a second time interval of the period of time prior to the first time interval, and wherein the third temporal bin corresponds to a third time interval of the period of time subsequent to the first time interval.

12. The method of claim 7, wherein the relationship between the plurality of sample values of the measurement parameter and the plurality of corresponding sample distance offset is a monotonic relationship.

* * * * *